United States Patent Office 3,399,515
Patented Sept. 3, 1968

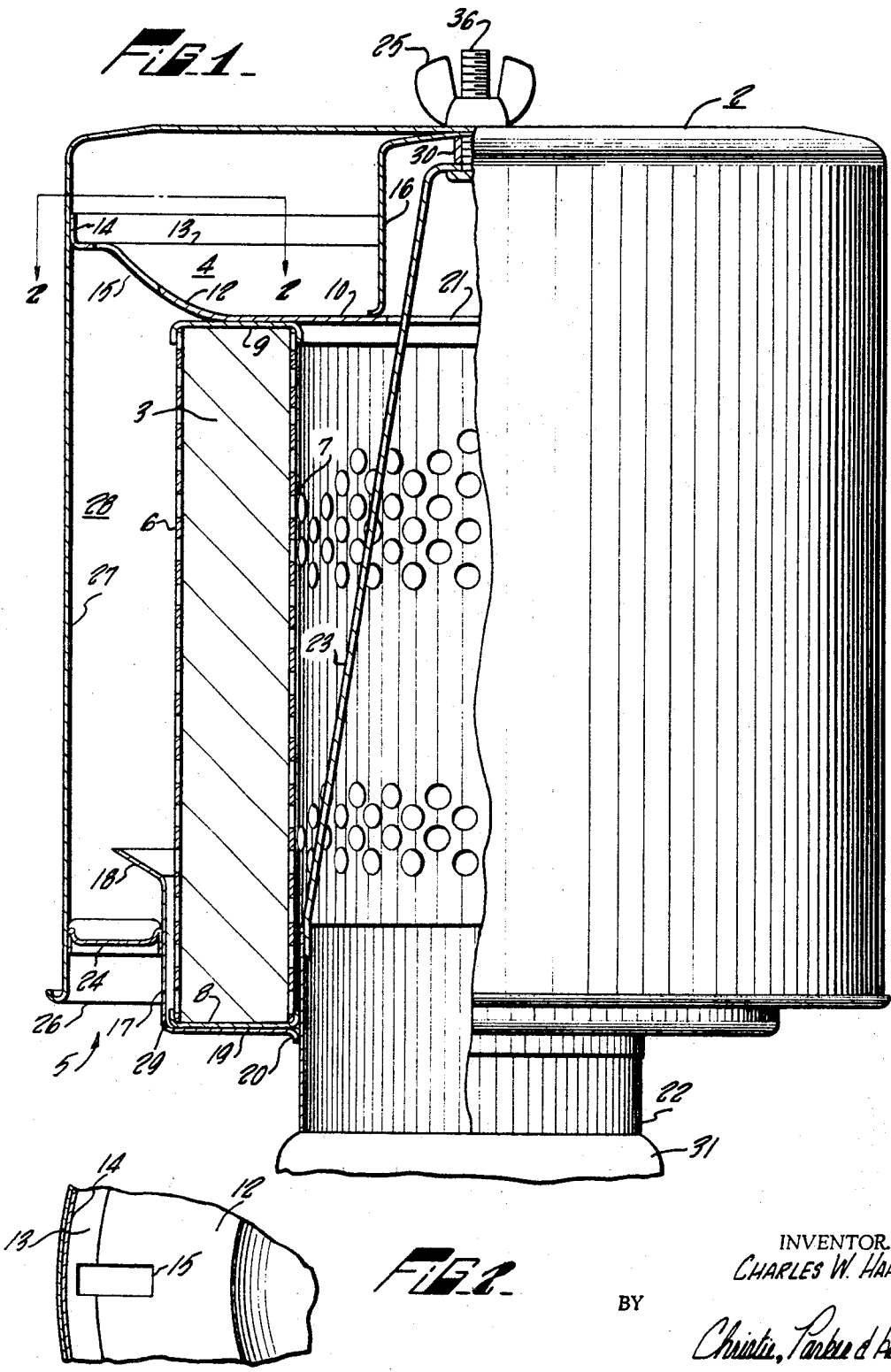

3,399,515
AIR CLEANER
Charles W. Hahl, Pomona, Calif., assignor to Vortox
Mfg. Company, Claremont, Calif., a corporation of
California
Filed Apr. 22, 1966, Ser. No. 544,481
1 Claim. (Cl. 55—337)

ABSTRACT OF THE DISCLOSURE

A dry air filter enclosed in a housing in spaced relationship from its inner wall to define an annular passage. A concave, saucer-shaped imperforate dust receptacle is seated in sealed abutment with the flat surface on the end of the filter. The sloping sides of the peripheral portion of the dust receptacle extend across the annular passage to define the end thereof. The concave side of the receptacle faces away from the filter. An opening in the receptacle near the outer edge of the peripheral portion forms a single point of exit from the annular passage to the receptacle. The air intake is located near the end of the housing opposite the dust receptacle. Specifically, the end of the housing opposite the dust receptacle is open and the air intake is formed by the annular space between the housing and the filter. The outlet for removal of air extends from the end of the housing opposite the dust receptacle at the center of the annular space to the manifold below.

---

The invention relates to air cleaners and, more specifically, to an air cleaner of the type, in which separation of dust by centrifugal force and by filtering both take place within one housing.

Typical of the type of air cleaner, in which the functions of separation of dust by centrifugal force and by filtering are both performed within one housing, is that disclosed in Patent 3,078,650 of Dale K. Anderson and William R. Wolff, issued Feb. 26, 1963. Such air cleaners are particularly adapted for use in the intake system of an internal combustion engine. A replaceable dry paper filter having a pervious cylindrical surface, through which the air to be filtered passes, is surrounded by a cylindrical housing with a large diameter. The cylindrical surfaces of the housing and the filter define an annular passage, into which an air intake tube opens. The intake tube protrudes from one end of the housing or the cylindrical side of the housing and faces upward when mounted. A protective cap is placed over the opening of the intake tube to prevent falling moisture and dust from entering the air cleaner. As a result, air is drawn upwards into the intake tube through an annular opening between the cap and the intake tube. The protruding intake tube and the protective cap add substantial bulk to the air cleaner system.

An outlet tube, which is at a lower pressure than the intake tube, carries the filtered air to the engine manifold. A louvered ring situated in the annular passage in the path of air entering from the intake tube imparts to the incoming air a swirling, spiral motion. As the air in the passage swirls around the side perimeter of the filter some of the dust particles, mostly the larger ones, are separated by centrifugal force and pass to a dust receptacle at the end of the housing opposite the intake tube. The rest of the dust is removed by the filter. Since a good deal of dust is separated by centrifugal force, the filter need not be replaced as often as otherwise. The more efficient that separation of dust by centrifugal force is, the longer is the life of the filter.

According to an aspect of the invention, in an air cleaner of the above described type the passage, in which air swirls around the side perimeter of the filter, has a portion that protrudes beyond one end surface of the filter. The housing that surrounds the filter extends beyond this end of the filter and defines in part the protruding portion of the passage. Air is introduced into the passage such that it swirls around the side perimeter of the filter toward the protruding portion of the passage. It has been experimentally observed that separation of dust by centrifugal force in this arrangement is very efficient.

More specifically, a saucer-shaped member with an interior surface in abutment with the one end of the filter and a peripheral surface bridging the space between the end surface of the filter and the extension of the housing serves as a receptacle to hold centrifugally separated dust. In addition to the extension of the housing, the protruding portion of the passage is defined by the peripheral surface of the saucer-shaped member. Centrifugally separated dust is removed from the passage through an opening in the surface of the saucer-shaped member.

This arrangement yields high efficiency in separating dust by centrifugal force regardless of the orientation of the air cleaner. It is particularly adapted, however, for vertical mounting with the saucer-shaped member located above the filter. In this case air is, according to another aspect of the invention, introduced into the passage from the bottom of the housing. The housing is open at its lower end and defines with the edge of the end of the filter an intake for air to be cleaned. Thus, no protruding intake tube and no protective cap are necessary. An especially compact air cleaner results. In particular, the sloping sides of the dust receptacle contain the dust particles as well as forming the protruding portion of the annular passage. It is particularly advantageous, when the outlet tube for the air cleaner, which is connected to the center of the filter, is located within the air intake. In this case the air cleaner can be conveniently mounted directly above the manifold of the engine.

These and other features of the invention are considered in the following detailed description taken in conjunction with the drawing, in which:

FIG. 1 is a side elevation view partially in section of an air cleaner illustrating the principles of the invention and FIG. 2 is a top view of the slot between the passage and the dust receptacle of the air cleaner in FIG. 1.

Reference is now made to FIG. 1, in which an air cleaner is assembled from four integral parts—a housing 2, an air filter 3, a dust receptacle 4, and a bottom member 5. Air filter 3 is a commercially available, cylindrical, dry paper filter that is hollow in the middle and open on both ends. A cylindrical, perforated metal sheet 6 serves as the side perimeter surface of filter 3 through which air to be filtered passes. Sheet 6 is therefore the outer cylindrical filter wall of filter 3. A cylindrical, perforated metal sheet 7 defines a hollow area within filter 3, through which the filtered air travels from the air cleaner. At the ends of filter 3 are annular members or caps 8 and 9, which are rigid enough to support filter 3 and resilient enough to provide a seal with abutting surfaces.

Dust receptacle 4 is a concave saucer-shaped body comprising a flat interior portion 10, a slanting peripheral portion 12, a horizontal lip portion 13, and a vertical flange portion 14. Dust receptacle 4 is oriented so that the inside of the saucer, i.e., the concave side of dust receptacle 4, faces away from filter 3. Flat interior portion 10 lies in sealed abutment with annular member 9 of filter 3. Peripheral portion 12 is terminated in lip 13 lying parallel to portion 10. Flange 14 lies perpendicular to and surrounds lip 13. Depending upon the thickness of annular member 9, receptacle 4 is spaced a distance from the body of filter 3. An opening 15, shown as a rectangular slot (FIG. 2), is provided in the wall of receptacle 4 for passage of centrifugally separated dust. A cup-shaped member 16 is spot welded and soldered to the inside of the saucer at the center of receptacle 4.

Bottom member 5 comprises several parts each spot welded and soldered together. A cylindrical skirt 17 is terminated at one end in an outwardly flared annular air deflector 18 and has an annular member 19 in sealed abutment with annular member 8 of filter 3. A flange 20, to which an outlet tube 22 is welded, extends from annular surface 19. A V-shaped bracket 23 is welded to outlet tube 22 for the purpose of assembling the parts of the air cleaner. A louvered ring 24 is also welded to cylindrical portion 17. Several holes such as 29 are provided to prevent moisture from being trapped between filter 3 and cylinder 17.

When the air cleaner is assembled, V-shaped bracket 23 extends through an opening 21 in the wall of receptacle 4 and is fastened to housing 2 by a wing nut 25, a tubular gasket 30, and a bolt 36. Filter 3 and dust receptacle 4 are then held in place by bottom member 5. The air cleaner is especially adapted to be mounted with dust receptacle 4 located above filter 3, as shown in FIG. 1, and placed directly over the manifold 31 of an engine. In this case, air is drawn upwards into the air cleaner through an annular intake 26 defined by the end of housing 2 and member 5. No protrusions from housing 2 or protective cap are necessary. Housing 2, in a sense, serves as the protective cap.

The air entering intake 26 passes through louvered ring 24, which imparts a spiral motion to the air. Air deflector 18 directs the air passing through louvered ring 24 outwardly, thereby increasing the centrifugal force exerted upon the dust particles. As air swirls around the passage defined by metal sheet 6 and the inside surface 27 of housing 2 some of the dust particles, mostly the larger ones, are separated by centrifugal force and pass through slot 15 into receptacle 4. The portion of surface 27 of housing 2 protruding beyond end member 9 of filter 3 and the portion of receptacle 4 bridging the space between housing 2 and filter 3 define a portion of passage that protrudes beyond end member 9. It has been determined experimentally that this protruding portion of passage 28 results in a marked improvement in the efficiency of the separation of dust by centrifugal force. In fact as high as 83% efficiency, i.e. removal of 83% of the dust in the air by centrifugal force, has been attained in experiments. It is believed, that this high efficiency results from an increase in the velocity of the air swirling around the annular passage near the receptacle. Thus a greater centrifugal force is exerted on these particles. In a typical air cleaner in which the diameter of the housing is 12 inches, the height of the filter is 10¼ inches, and the outside diameter of the filter is 9 inches, the perpendicular distance between lip 13 and a plane parallel to annular member 9 is 1 inch.

Air is drawn into filter 3 and passes from the hollow middle of filter 3 out of the air cleaner through outlet tube 22. It has been found that high efficiency is attained, regardless of the orientation of the air cleaner. As noted previously, however, it is particularly advantageous, from the point of view of space when the air cleaner is mounted with receptacle 4 located above filter 3, because no protective cap or protruding tube must then be provided for the air intake.

What is claimed is:
1. An air cleaner comprising:
   a hollow, cylindrical skirt with a top end and a bottom end;
   an annular member covering the bottom end of the skirt and being formed integral with the skirt, the member having an opening at its center;
   an outwardly flared annular air deflector formed integral with the top end of the skirt;
   an outlet tube attached to the bottom of the annular member so as to communicate with the opening in the member, the tube being coaxial with the cylindrical axis of the skirt;
   a V-shaped bracket having two arms, the ends of which are attached to the inside of the outlet tube, the arms of the bracket converging upwardly from the outlet tube symmetrically about the cylindrical axis of the skirt;
   a louvered ring attached to the skirt and extending completely around the outside perimeter of the skirt;
   a bolt extending upwardly from the top of the bracket;
   an annular air filter having an outside diameter slightly smaller than the inside diameter of the cylindrical skirt and being substantially greater in height than the cylindrical skirt;
   the air filter having a first cylindrical perforated sheet defining its outside surface and serving as a filter wall through which air to be filtered passes, a second cylindrical perforated sheet with a smaller diameter than the first sheet defining a cylindrical passage through the center of the filter and serving as the filter wall through which the filtered air passes, a first annular cap covering the top end of the filter, and a second annular cap covering the bottom end of the filter;
   the filter lying within the cylindrical skirt so the second cap is in abutment with the annular portion, the top of the cylinder extends substantially above the annular portion, and the bracket passes through the cylindrical passage of the filter;
   a saucer-shaped dust receptacle having a concave top surface, an opening at its center, a cup-shaped member with an opening for the bolt at its top extending upwardly from the top surface at the center of the receptacle and covering the opening in the receptacle such that the inside of the cup-shaped member is accessible through the opening in the receptacle, an annular flat portion surrounding the cup-shaped member, an upwardly sloped portion surrounding the flat portion, a lip portion surrounding the sloped portion, and an upwardly directed flange surrounding the lip portion, the outside diameter of the flange being substantially equal to the outside diameter of the louvered ring;
   the receptacle being mounted on top of the filter such that the flat portion of the receptacle lies in sealed abutment with the first cap of the filter, the top surface of the receptacle faces away from the filter, the bracket extends inside of the cup-shaped member, and the bolt at the top of the bracket extends through an opening in the cup-shaped member;
   the receptacle having a sole opening in the upwardly sloped portions for the passage of dust from the air around the outside surface of the filter to the top surface of the receptacle;
   a hollow cylindrical housing open at its bottom and closed at its top by an end member with an opening for the bolt at its center, the housing having an inside diameter substantially the same as the outside diameter of the flange of the receptacle, said flange at all points of its periphery engaging the inside of said housing;
   said louvered ring at all points of its periphery engaging the inside of said housing;
   the skirt, the annular member, the deflector, the bracket, the ring, the filter, and the dust receptacle lying within the housing so that the bolt extends through the opening in the end member of the housing and the end member of the housing abuts the top of the cup-shaped member; and
   a wing nut engaging the bolt outside of the housing to secure the bracket to the housing, said louvers dis- posed at an angle with the horizontal and radially extending from the axis of said skirt to impart a whirling motion to the gas passing therebetween.

References Cited

UNITED STATES PATENTS

| | | | |
|---|---|---|---|
| 1,702,804 | 2/1929 | Winslow | 55—426 |
| 1,864,201 | 6/1932 | Kegerreis et al. | |
| 2,417,130 | 3/1947 | Russell | 55—394 |
| 2,894,600 | 7/1959 | Veres | 55 |
| 3,078,650 | 2/1963 | Anderson et al. | 55—337 |

FOREIGN PATENTS 63,092    3/1955    France.
1,278,115    10/1961    France.

OTHER REFERENCES

Netherlands printed application No. 286,247, (A) printed February 1965 (Copy in class 55 subclass 377).

HARRY B. THORNTON, *Primary Examiner.*

D. TALBERT, *Assistant Examiner.*